(12) United States Patent
Fujii et al.

(10) Patent No.: US 8,328,688 B2
(45) Date of Patent: Dec. 11, 2012

(54) RATIO SHIFT CONTROL SYSTEM AND METHOD FOR A MULTIPLE-RATIO AUTOMATIC TRANSMISSION

(75) Inventors: Yuji Fujii, Ann Arbor, MI (US); Jahan Asgari, Dearborn, MI (US); Davorin David Hrovat, Ann Arbor, MI (US); Hong Jiang, Canton, MI (US); Gregory Michael Pietron, Canton, MI (US); Bradley Dean Riedle, Northville, MI (US); Christopher John Teslak, Plymouth, MI (US); Hongtei Eric Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 301 days.

(21) Appl. No.: 12/858,468

(22) Filed: Aug. 18, 2010

(65) Prior Publication Data

US 2011/0184612 A1 Jul. 28, 2011

Related U.S. Application Data

(63) Continuation-in-part of application No. 12/693,086, filed on Jan. 25, 2010, now abandoned.

(51) Int. Cl.
*F16H 61/00* (2006.01)
*G06F 19/00* (2011.01)

(52) U.S. Cl. ......................... 477/155; 701/55

(58) Field of Classification Search ................... 477/155
See application file for complete search history.

(56) References Cited

U.S. PATENT DOCUMENTS

| | | | |
|---|---|---|---|
| 4,724,723 A | 2/1988 | Lockhart et al. | |
| 5,058,015 A | 10/1991 | Leorat | |
| 5,188,005 A * | 2/1993 | Sankpal et al. | 477/102 |
| 5,669,851 A | 9/1997 | Tietze | |
| 5,839,987 A * | 11/1998 | Sawamura et al. | 477/107 |
| 7,300,381 B2 | 11/2007 | Badillo et al. | |
| 7,351,183 B2 * | 4/2008 | Fujii et al. | 477/109 |
| 7,503,875 B2 * | 3/2009 | Fujii et al. | 477/107 |
| 2002/0025885 A1 | 2/2002 | Saito et al. | |
| 2004/0242374 A1 | 12/2004 | Wheals | |
| 2006/0135316 A1 | 6/2006 | Fujii et al. | |
| 2012/0130608 A1 * | 5/2012 | Fujii et al. | 701/54 |
| 2012/0130610 A1 * | 5/2012 | Lee et al. | 701/58 |

* cited by examiner

*Primary Examiner* — Dirk Wright (74) *Attorney, Agent, or Firm* — David B. Kelley; Brooks Kushman P.C.

(57) ABSTRACT

A control system and method for controlling a multiple gear ratio automatic transmission in a powertrain for an automatic transmission having pressure activated friction torque elements to effect gear ratio upshifts. The friction torque elements are synchronously engaged and released during a torque phase of an upshift event as torque from a torque source is increased while allowing the off-going friction elements to slip, followed by an inertia phase during which torque from a torque source is modulated. A perceptible transmission output torque reduction during an upshift is avoided.

35 Claims, 9 Drawing Sheets

RATIO SHIFT CONTROL SYSTEM AND METHOD FOR A MULTIPLE-RATIO AUTOMATIC TRANSMISSION

CROSS-REFERENCE TO RELATED APPLICATION

This application is a continuation-in-part of application Ser. No. 12/693,086, filed Jan. 25, 2010, which is assigned to the assignee of the present application. Applicants claim the benefit of that application.

BACKGROUND

1. Technical Field

The invention relates to a multiple-ratio transmission mechanism in a powertrain for an automotive vehicle and to a control strategy for achieving smooth engagement and release of friction torque establishing elements during a transmission upshift event.

2. Background

In a geared automatic transmission in an automotive vehicle powertrain having an engine or other torque source, a ratio change may be made from a so-called low ratio to a so-called higher ratio when a friction torque establishing element, such as a clutch or brake, is engaged in synchronism with disengagement of a companion friction torque establishing element. This is referred to as a ratio upshift. The friction torque establishing elements involved in the upshift may be referred to as an oncoming clutch or brake and an off-going clutch or brake. The upshift event is characterized by a preparatory phase, a torque phase and an inertia phase as the vehicle accelerates from a standing start.

In a conventional automatic transmission in a vehicle powertrain, the oncoming clutch torque capacity is controlled to increase from a low value during the torque phase. Simultaneous engagement of one clutch or brake and release of another results in a momentary activation of two torque flow paths through the gearing, causing a gear tie-up in which transmission output shaft torque decreases momentarily. This condition may be referred to as a "torque hole". It occurs before the off-going clutch totally disengages.

Friction elements, such as disc clutches, band brakes and disc brakes, typically are actuated hydraulically under the control of a transmission control module, which disengages an off-going friction clutch or brake while simultaneously engaging an oncoming friction clutch or brake during an upshift in order to lower speed ratio. For purposes of the present description of the invention, the clutch and the brake will be referred to as friction elements.

During the preparatory phase, an automatic transmission control reduces off-going friction element torque capacity to prepare it for release as an actuator for the oncoming friction element is adjusted to prepare for its engagement. During the torque phase, the controller increases oncoming friction element torque capacity, which causes torque transmitted through the off-going friction element to drop quickly due to the transient gear tie up.

As torque is transmitted through the off-going friction element deceases, the automatic transmission output shaft torque drops, which causes the so-called torque hole. This is perceived by a vehicle occupant as an unpleasant shift shock. The inertia phase begins when the off-going clutch is released with no significant torque capacity.

SUMMARY

The invention comprises a transmission ratio control system and method that eliminates or reduces a so-called torque hole during upshifting of transmission gearing of a step ratio automatic transmission. The automatic transmission, for example, can be either a layshaft transmission with two torque input friction elements between a torque source and the transmission gearing, or a step ratio automatic transmission with planetary gearing, wherein a ratio change in the gearing during an upshifting event is effected by engaging one torque input friction element for the gearing and simultaneously disengaging another torque input friction element for the gearing. For purposes of describing the present invention, reference will be made to a lay-shaft type transmission.

The invention includes a strategy for execution of control algorithms that will achieve a desired output shaft torque profile that will avoid significant output shaft torque disturbances.

In the case of a powertrain with an internal combustion engine, torque input to the automatic transmission is increased during the torque phase of the shifting event. This is achieved by engine throttle control, spark timing adjustment for the engine (torque source), intake and exhaust valve timing control for the engine or by other means, such as by using auxiliary electric motor torque, based on an open loop control, a closed loop control, or a combination of both using engine speed, off-going and oncoming clutch slip speed measurements, and clutch actuator position measurements.

According to one aspect of the invention, a software-based controller is provided to self-calibrate a level of oncoming clutch torque capacity using algorithms in the form of algebraic equations whereby a desired output shaft torque profile is achieved while the off-going clutch slips during the torque phase in a controlled manner.

According to another aspect of the invention, the desired output shaft torque profile is achieved for a chosen off-going clutch torque capacity.

The invention, in executing the foregoing control features, may decouple control of engine torque or the input shaft torque from an oncoming clutch torque control during the torque phase, while the off-going clutch slips, and to achieve a desired off-going clutch slip based on a closed loop control of input shaft torque or engine torque. The end of the torque phase is determined based on torque level transmitted through the off-going clutch.

According to a further aspect of the invention, governing algebraic equations are used to determine a level of the oncoming clutch torque capacity to achieve a seamless transition from the torque phase to the inertia phase. This involves a self-calibration of a level of oncoming clutch torque capacity during the inertia phase to achieve a desired output shaft torque level.

In one embodiment of the invention, the off-going friction element is allowed to slip during the torque phase of a shift event as slip of the oncoming friction element is controlled.

According to another aspect of the invention, input torque may be increased during the torque phase, and the change in torque may be used in a determination of torque capacity of the off-going friction element during the torque phase. Torque of the torque source is reduced during the inertia phase and then restored, at least partially, after the inertia phase.

According to another aspect of the invention, control of the oncoming clutch torque control is decoupled from engine or input shaft control during the torque phase, and a desired off-going clutch slip is achieved based on a closed-loop control of input shaft torque (e.g., engine torque).

According to another aspect of the invention, the end of the torque phase is determined based on the torque level transmitted through the off-going clutch.

According to another aspect of the invention, a target level of oncoming clutch torque capacity is determined using governing equations to achieve a seamless output shaft torque transition from the torque phase to the inertia phase.

According to another aspect of the invention, a target level of oncoming clutch torque capacity is determined during the inertia phase using governing equations to achieve a desired output shaft torque level.

PARTICULAR DESCRIPTION OF AN EMBODIMENT OF THE INVENTION

Figure 1:
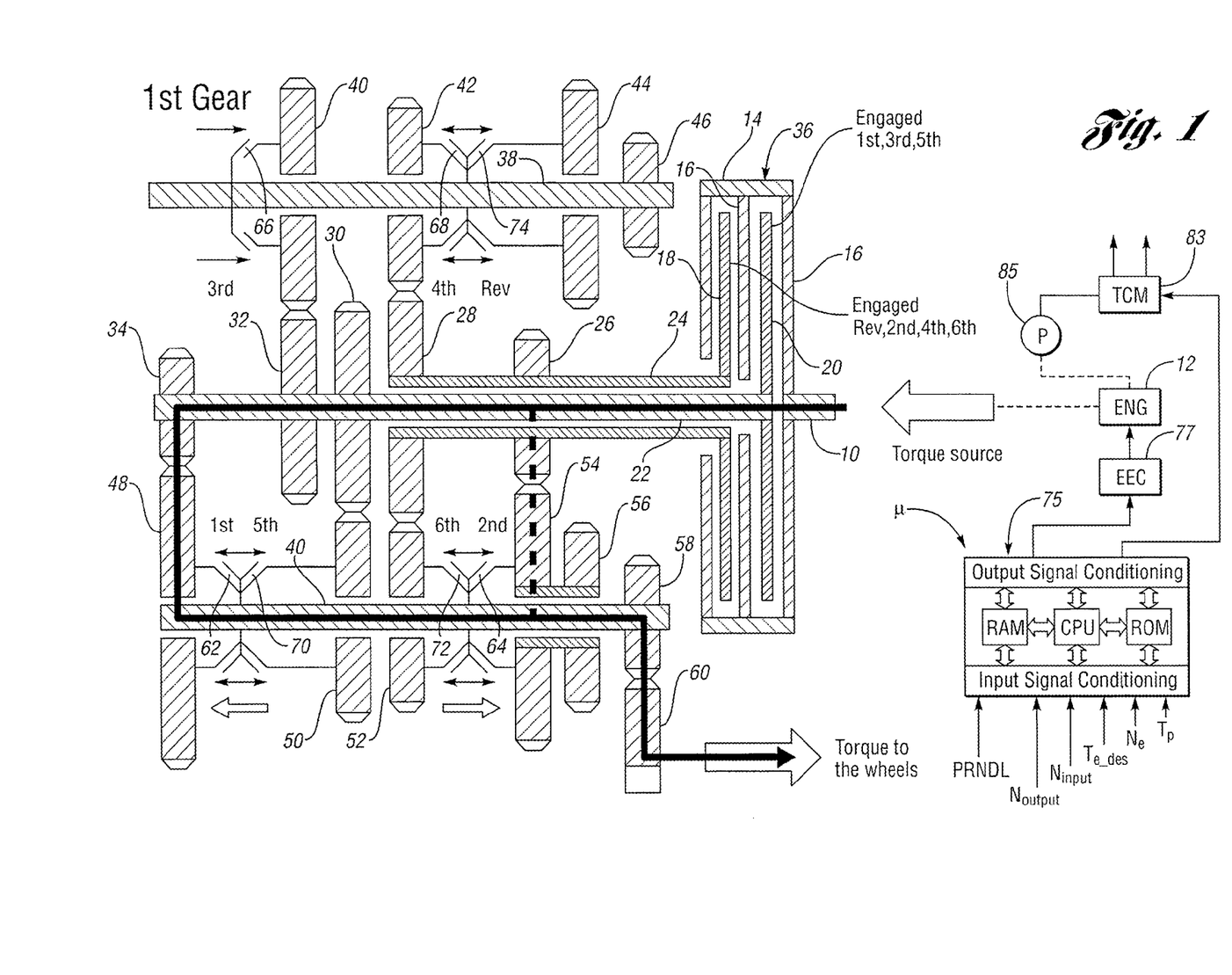
FIG. 1 is a schematic illustration of a layshaft transmission in a first gear or low gear operating mode, which includes tandem torque input clutches that are selectively and alternately engaged and released.

FIG. 1 shows a schematic form of a lay-shaft transmission capable of embodying the invention together with a schematic representation of the transmission components involved in gear ratio changes.

Numeral 10 represents a power input shaft drivably connected to torque source 12. Input shaft 10 drives a clutch housing 14, which carries torque input driving discs 16 situated in inter-digital relationship with respect to driven discs 18 and 20. A fluid pressure actuator or electro-mechanical actuator of any known design is used to selectively engage driven discs 18 and 20 with respect to driving discs 16. Discs 20 are connected to a central torque input shaft 22 and discs 18 are connected to torque input sleeve shaft 24. Although only one disc 18 and only one disc 20 are shown in the schematic view of FIGS. 1 and 1a, several discs in a friction disc assembly may be used.

Drive gear elements 26 and 28 are connected drivably to the sleeve shaft 24. Gear element 26 has a smaller pitch diameter than gear element 28.

Central power input shaft 22 is drivably connected to drive gear element 30, gear element 32 and gear element 34, which have decreasing pitch diameters.

When driving clutch discs 20 are engaged, driving torque is distributed through engaged clutch discs 20 to the gear elements 30, 32 and 34. Clutch discs 20 and 18 are part of the clutch structure that may be referred to as a tandem or dual clutch 36.

When clutch discs 18 are engaged by the tandem clutch 36, torque from the torque source is distributed directly to torque input gears 26 and 28.

The layshaft transmission of FIG. 1 has two countershafts, shown at 38 and 40. Countershaft 38 supports rotatably a third ratio countershaft gear element 40, a fourth ratio countershaft gear element 42 and a reverse countershaft gear element 44. A torque transfer gear element 46 is directly connected to the countershaft 38.

Countershaft 40 rotatably supports countershaft gear elements 48, 50 and 52, which have progressively decreasing pitch diameters. Countershaft gear element 48 is a first ratio gear element, countershaft gear element 50 is a fifth ratio gear element and countershaft gear element 52 is a sixth ratio gear element.

Countershaft gear elements 54 and 56 also are rotatably supported by countershaft 40. Gear element 54 drivably engages gear element 26 during second ratio operation. Countershaft gear element 56 drivably engages a reverse drive pinion (not shown), which in turn drivably engages reverse gear element 44 during reverse drive operation. Gear element 46 connected to countershaft 38 is drivably connected to gear element 58, which is drivably connected to countershaft 40, for example, through torque transfer gearing (not shown in FIG. 1). The countershafts and the central shaft 22 actually are not in the same plane, so torque transfer gearing and the reverse drive pinions are not illustrated in the schematic illustration of FIG. 1.

Gear 58 is connected drivably to torque output gear 60, which is drivably connected to vehicle traction wheels.

During first gear ratio operation, gear 48 is connected drivably through synchronizer clutch 62 to countershaft 40, and clutch 36 engages discs 20 as discs 18 are disengaged. At that time, second ratio synchronizer clutch 64 drivably engages gear element 54 to precondition gear element 54 for second ratio operation. Power then is delivered from the torque source through clutch discs 20 to central shaft 22 so that torque is delivered from gear 34, to countershaft 40 and engaged gears 58 and 60.

An upshift is made from the first gear ratio to the second gear ratio by disengaging clutch discs 20 and engaging clutch disc 18 for the tandem clutch. To make a smooth transition from the first gear ratio to the second gear ratio, discs 18 are engaged as discs 20 are slowly disengaged to allow for clutch slip. At this time, third ratio synchronizer clutch 66 is engaged thereby connecting countershaft gear element 40 to countershaft 38. This preselects third ratio while the transmission operates in the second ratio. An upshift to the third ratio is achieved by tandem clutch 36 as clutch discs 20 are engaged and clutch discs 18 are disengaged. At this time, the fourth ratio synchronizer clutch 68 is engaged to preselect the fourth ratio. An upshift from the third gear ratio to the fourth gear ratio then is achieved by disengaging clutch discs 20 and engaging clutch discs 18. At this time, fifth gear ratio is preselected by engaging synchronizer clutch 70. An upshift to the fifth ratio then is achieved by engaging friction discs 20 and disengaging friction discs 18. At this time, the sixth ratio is preselected by engaging synchronizer clutch 72.

An upshift to the sixth ratio is achieved by again trading engagement of the discs for the tandem clutch 36. Clutch discs 20 are disengaged as clutch discs 18 are engaged.

Reverse drive is obtained by disengaging the forward drive synchronizer clutch and engaging reverse drive synchronizer clutch 74. Reverse driving torque then is delivered through sleeve shaft 24, gear 26, gear element 54 and gear element 56, reverse drive pinion gearing, countershaft 38 and torque transfer gear elements 46 and 58.

If the torque source is an internal combustion engine, the upshift controls would include a microprocessor 75, which may be of conventional design, an electronic engine control 77, including an engine fuel and spark retard controller, and a transmission control module 83.

The microprocessor 75 receives, when the torque source is an engine, input signals such as driver desired input torque ($T_{e\_des}$) input speed ($N_e$), driver-selected ratio range (PRNDL), transmission input speed ($N_{input}$), engine throttle position (Tp) if the torque source is a throttle-controlled engine, and transmission output speed ($N_{output}$). The input signals are received by random access memory (RAM) from data input ports. A central processor unit (CPU) receives the input signals that are stored in RAM and uses the information fetched from RAM to execute algorithms that define control strategies stored in ROM. Output signals are delivered from signal output ports to the controllers 77 and 83. Actuating pressure for the clutches is supplied by pump 85 driven by engine 12 or by an electro-magnetic force actuator.

Figure 1A:
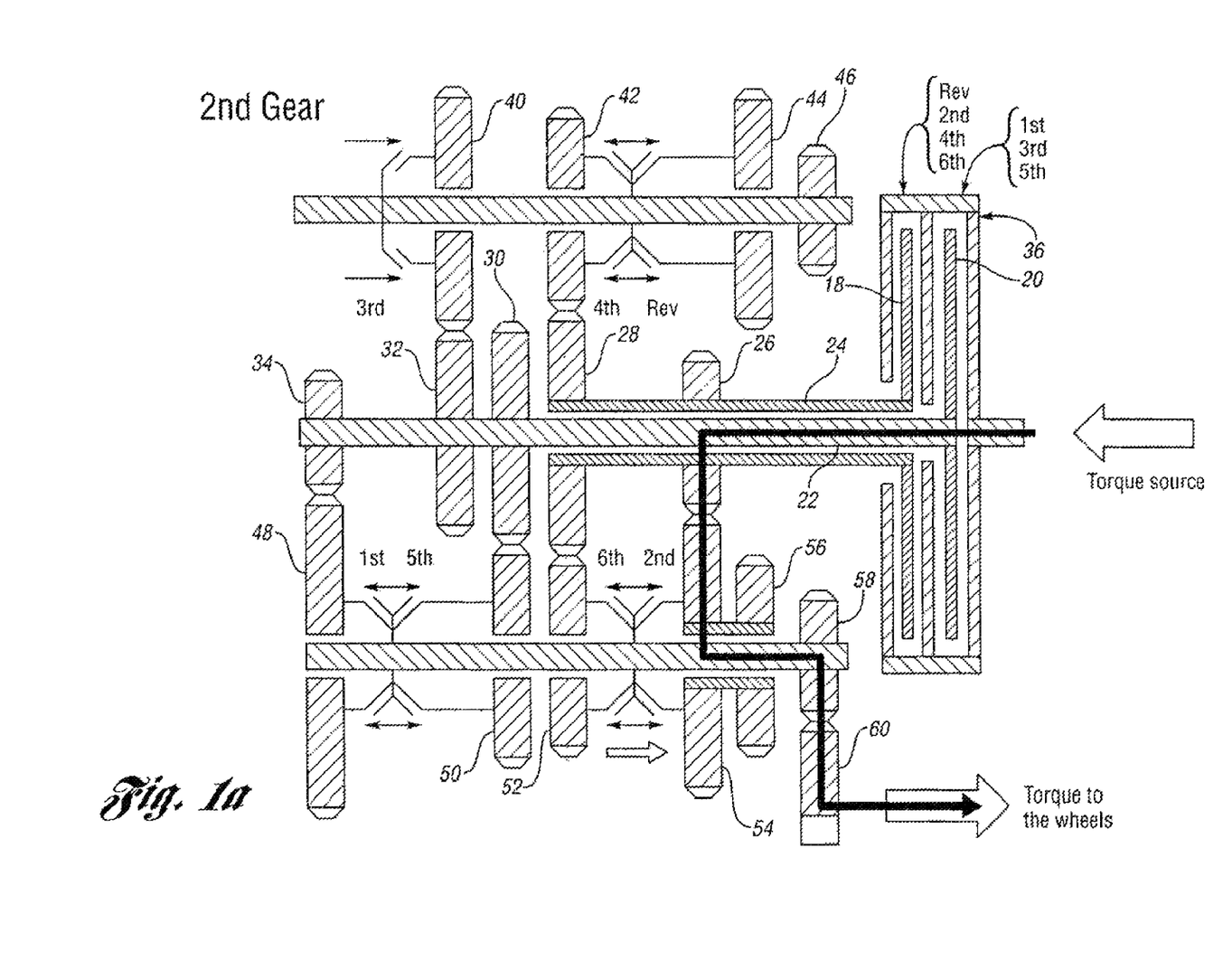
FIG. 1a is a schematic illustration of the gearing arrangement of FIG. 1 wherein the elements of the gearing are conditioned for high or second gear operating mode.

FIG. 1a shows the gearing configuration during operation of the transmission in second gear ratio, which is the upshifted ratio. When the transmission operates in the second ratio, torque is delivered, as previously mentioned, to sleeve shaft 24 and through a second gear set, which comprises gear 26, gear element 54 and transfer gears 58 and 60. This gearing may be referred to as the second gear set. The gearing previously described with respect to FIG. 1 for first gear operation hereafter may be referred to as the first gear set.

Figure 2:
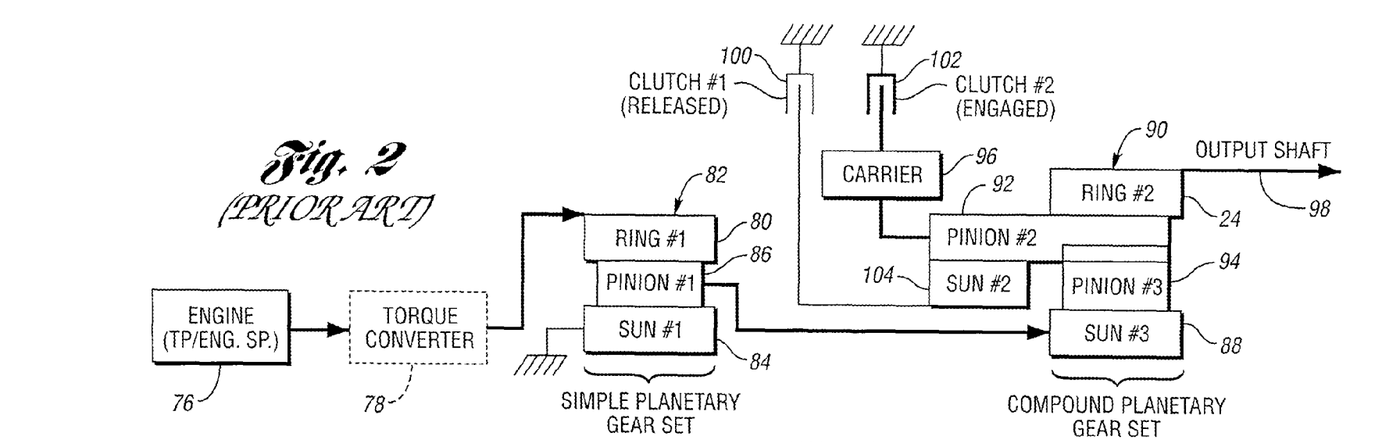
FIG. 2 is a schematic representation of a planetary type transmission that is capable of embodying the invention wherein the elements of the planetary gearing are conditioned for a low or first gear operating mode.
Figure 2A:
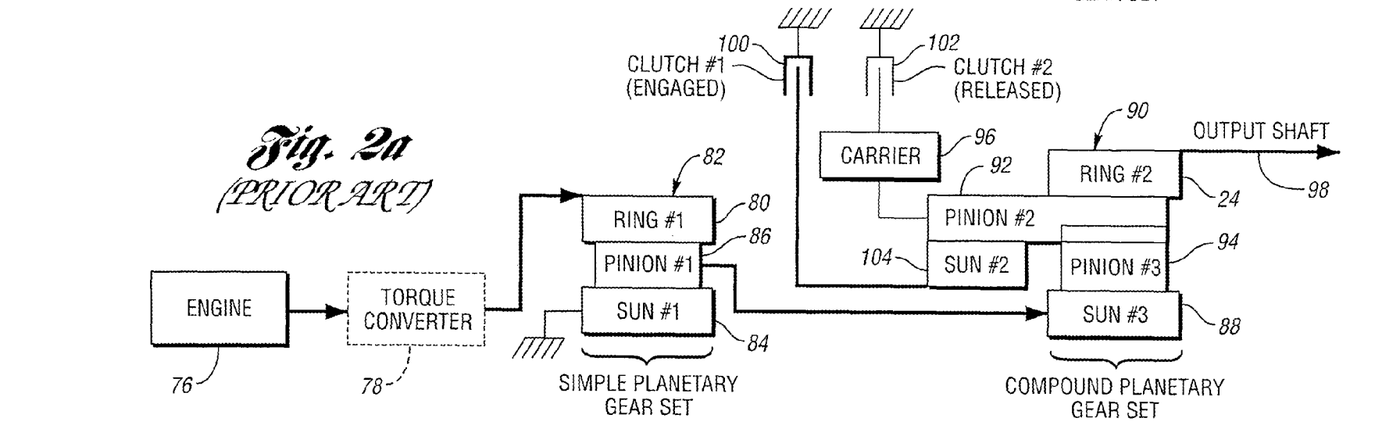
FIG. 2a is a schematic representation corresponding to FIG. 2 wherein the elements are conditioned for a second or high gear operating mode.

FIGS. 2 and 2a show a schematic representation of a planetary type transmission that may embody the present invention. A torque source may be an engine 76 that drives a ring gear 80 of a simple planetary gear unit 82, which has a sun gear 84 and a planetary carrier 86. A hydrokinetic torque converter may be included in the transmission if a design objective requires it. It is shown at 78 in FIGS. 2 and 2a with phantom dotted lines since some designs capable of using the invention do no need a torque converter. If a torque converter is included, the converter turbine torque would be the input torque. The torque converter could be deleted if it is not needed. Carrier 86 supports planetary pinions that engage ring gear 80 and sun gear 84. The output torque from the carrier drives sun gear 88 of a compound planetary gear set 90. Compound planetary pinions 92 and 94 supported on a common carrier 96 engage respectively ring gear 90 and sun gear 88. The ring gear is connected to the output shaft 98.

During low gear ratio operation, friction brake 100 is disengaged. Brake 100 may be referred to as clutch #1. This corresponds to tandem clutch 36 of FIGS. 1 and 1a when clutch discs 18 are released or disengaged. Brake 102 in FIG. 2, which is engaged in low speed ratio operation, corresponds to tandem clutch 36 shown in FIGS. 1 and 1a when clutch discs 20 are engaged. Clutch #2 in FIG. 2 (brake 102) provides a reaction point for the carrier 96. Sun gear, shown at 104, which drivably engages with compound planetary pinion 92, merely idles during low speed ratio operation.

When the gearing of FIGS. 2 and 2a is operating in the second ratio, sun gear 104 is anchored by brake 100 so that the ring gear for compound planetary gear unit 92 is driven at an increased rate relative to the carrier speed of the simple planetary gear set 82.

For purposes of this description, it will be assumed that if the powertrain has no hydrokinetic torque converter, torque input to the transmission will be referred to as engine torque ($T_e$). If the powertrain has a torque converter, the engine torque would be replaced by converter turbine torque.

Figure 2B:
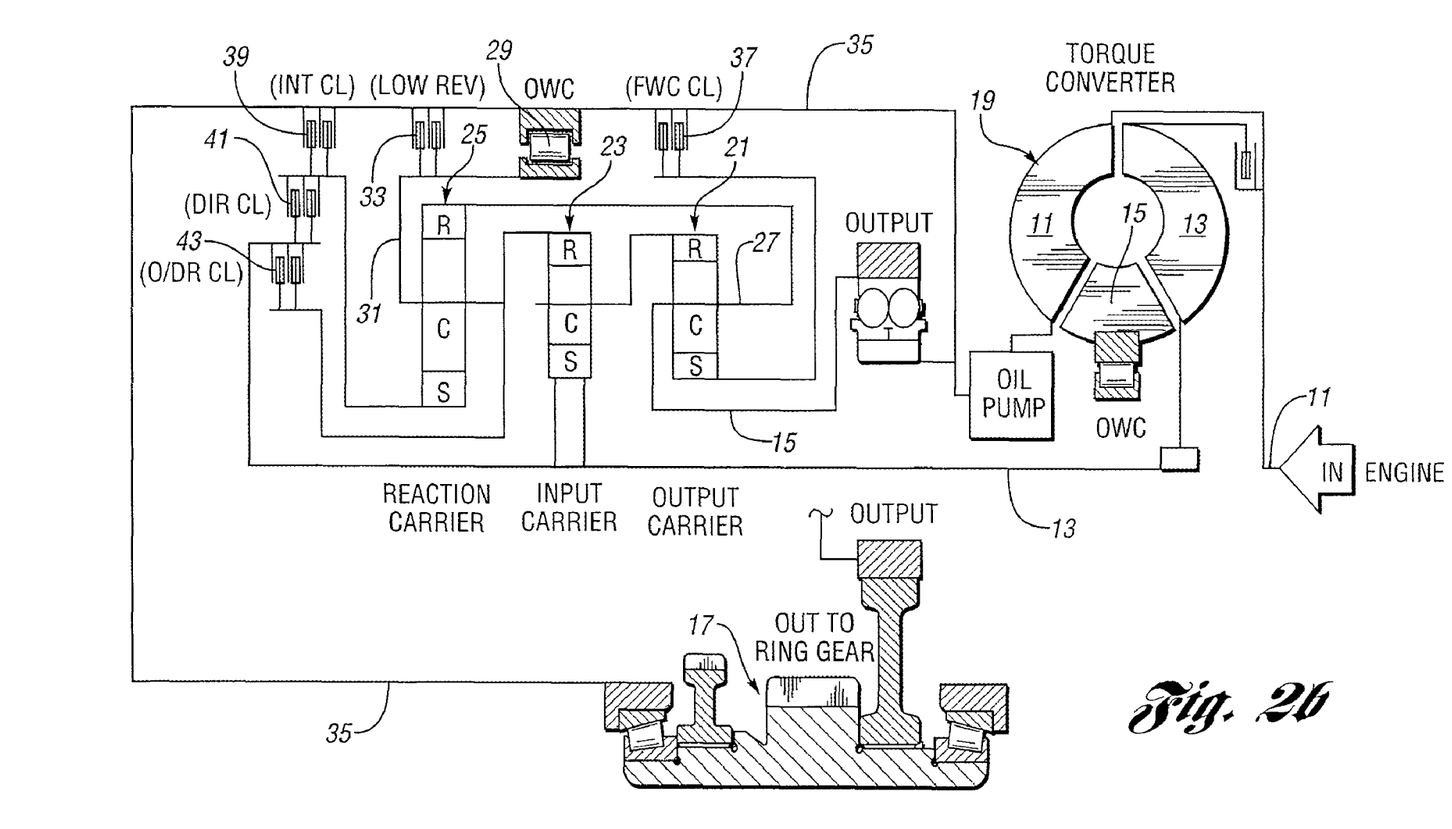
FIG. 2b is a schematic representation of another planetary transmission that is capable of embodying the invention.

FIG. 2b shows an example of another planetary step-ratio automatic transmission that may embody the invention. It comprises an engine driven torque input shaft 11 and a transmission input shaft 13. A transmission output shaft 15 delivers torque to transmission torque output gearing 17. A torque converter may be disposed between engine driven torque input shaft 11 and a transmission input shaft 13, as shown at 19. A torque converter impeller 11 is in fluid flow relationship with respect to turbine 13. A stator 15 is disposed between the flow inlet section of impeller 11 and the flow exit section of turbine 13.

In the example of a planetary transmission shown in FIG. 2b, there are three simply planetary gear units 21, 23 and 25. Output torque is delivered from the carrier 27 to the torque output gearing. Carrier 27 is connected to the ring gear for gear unit 25 and to output shaft 15. An overrunning coupling 29 anchors the carrier 31 of planetary gear unit 25 against rotation in one direction, but freewheeling motion is provided in the opposite direction. During reverse and during low ratio operation, carrier 31 is braked by coupling 33 against the transmission housing 35. During forward drive operation, the sun gear for gear unit 21 is anchored to the housing through forward drive coupling 37.

During intermediate ratio operation, the sun gear for gear unit 25 is anchored to the housing 35 by intermediate coupling 39.

During direct drive, the transmission input shaft 13 is clutched by direct coupling 41 to input shaft 13, thus establishing a one-to-one driving ratio through the planetary gearing. Overdrive coupling 43, when engaged, directly connects the carrier for gear unit 25 and the ring gear for gear unit 23 to the input shaft 13. FIG. 1a shows an engine 12 which acts as a source of torque for the transmission. If the transmission has a torque converter, engine speed will equal speed of converter impeller 22 and transmission input speed would equal converter turbine speed.

Figure 3:
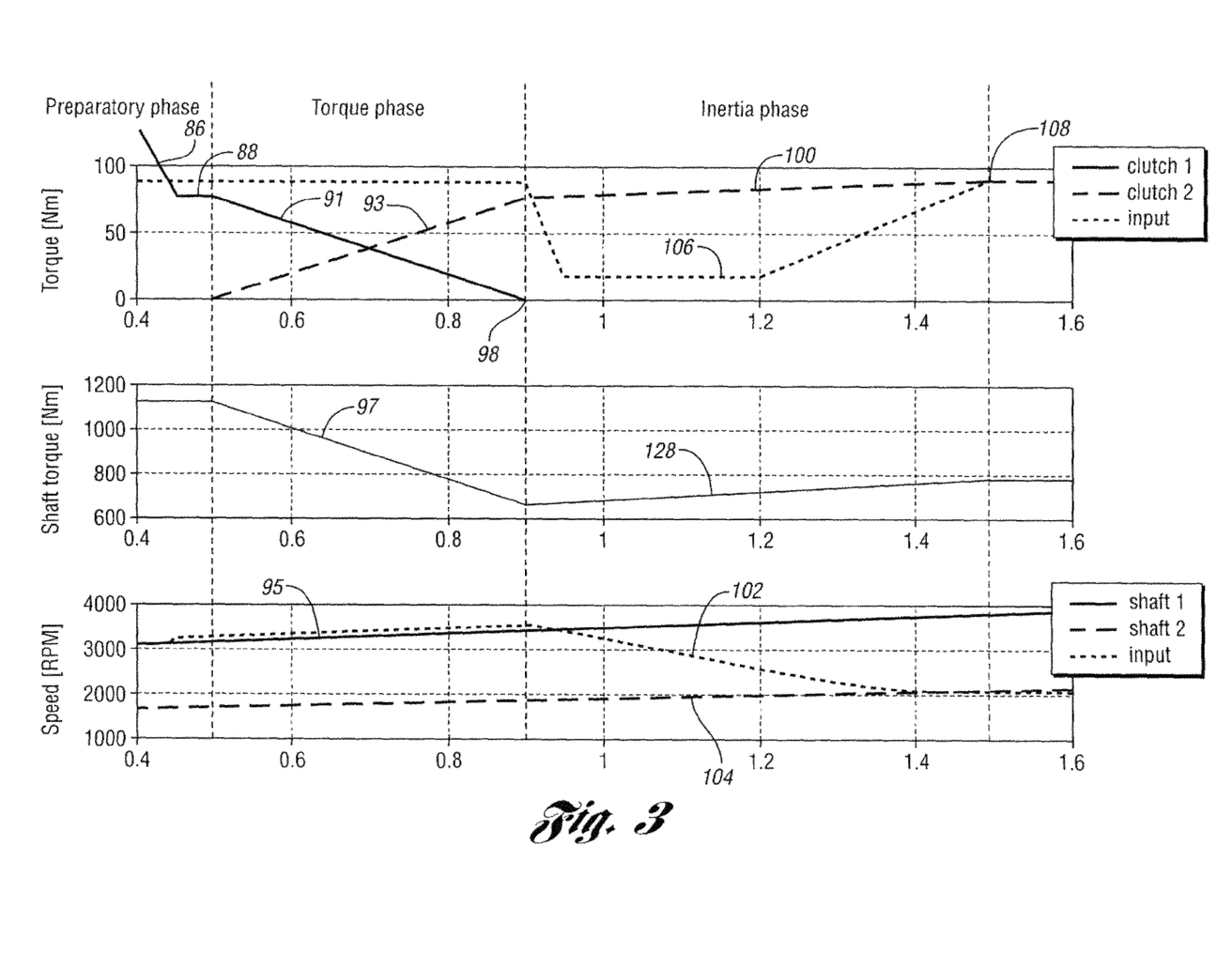
FIG. 3 is a time plot for a synchronous clutch-to-clutch upshift control characterized by a so-called torque hole at the output shaft.

FIG. 3 shows a strategy for a typical known upshift event from a low gear configuration (i.e., high torque ratio) to a high gear configuration (i.e., low torque ratio) when the engine has a constant throttle setting, in accordance with a conventional upshift control method for a lay-shaft transmission of the type shown in FIGS. 1 and 1a. This strategy of the invention would apply also to a transmission such as the compound planetary transmission of FIGS. 2 and 2a and the planetary transmission of FIG. 2b.

The shift event is divided into a preparatory phase, a torque phase, and an inertia phase. During the preparatory phase, torque capacity of clutch 20, which is the off-going clutch, is reduced, as shown at 86, to prepare for its release. However, enough clutch torque capacity is maintained at 88 to only allow a small incipient slip near the end of the preparatory phase, as shown by the small separation between the dotted input torque line 106 and OGC line 86. Transmission controller 82 adjusts an actuator piston for clutch 18 (clutch #2), which is referred to as the oncoming clutch, to prepare for its engagement. At that point, the oncoming clutch 18, in a synchronous upshift event, is yet to carry significant torque capacity.

During the torque phase of the control shown in FIG. 3, off-going clutch capacity is further reduced, as shown at 91, while the controller 82 increases oncoming clutch torque capacity, as shown at 93. Engine speed and input shaft speed are the same if the transmission has no torque converter between the engine and the clutch 36. However, as will be explained subsequently in a discussion of FIG. 4, off-going clutch torque capacity may be controlled to induce a small target level slip at 91, which allows engine speed 95 to be higher than the speed of shaft 22. When the off-going clutch slips, off-going clutch torque 91, or frictional torque generated by slipping, drives shaft 22, seen in FIGS. 1 and 1a, and the downstream gear elements (gearset #1), all the way to the output shaft. Increasing oncoming clutch torque 93 starts balancing torque distributed from the engine and reduces the off-going clutch torque capacity requirement at 91. Thus, the off-going clutch and the oncoming clutch work together to maintain off-going clutch target level slip as the off-going clutch torque decreases as shown at 91.

During the torque phase of the shift characteristic shown in FIG. 3, an increase in oncoming clutch torque capacity (clutch #2 capacity) reduces net torque flow through the off-going clutch when the off-going clutch remains engaged. Thus, the output shaft torque drops significantly, as shown at 97, creating a so-called torque hole. A large torque hole can be perceived by a vehicle occupant as a sluggish powertrain performance or an unpleasant shift shock.

The inertia phase begins when the off-going clutch capacity is reduced to a non-significant level, as shown at 98. Oncoming clutch (clutch #2) carries enough torque capacity, as shown at 100, to pull down engine speed, as shown at 102, closer to that of the speed of shaft #2, as indicated at 104.

FIG. 3 shows reduced input torque during the inertia phase, as shown at 106. This is typically due to engine spark timing control, which is common practice in the conventional shift control method, to enable the oncoming clutch to engage within a target shift duration without excessive torque capacity.

The shift event is completed, as shown in FIG. 3, when clutch #2 (the oncoming clutch) is engaged. The input shaft then is securely coupled to shaft 24, seen in FIG. 1, thereby matching engine speed 102 to shaft speed 104. The engine torque reduction at 106 is removed at 108 and the output shaft torque returns to the level that corresponds to an engine torque level during the high gear configuration.

Figure 4:
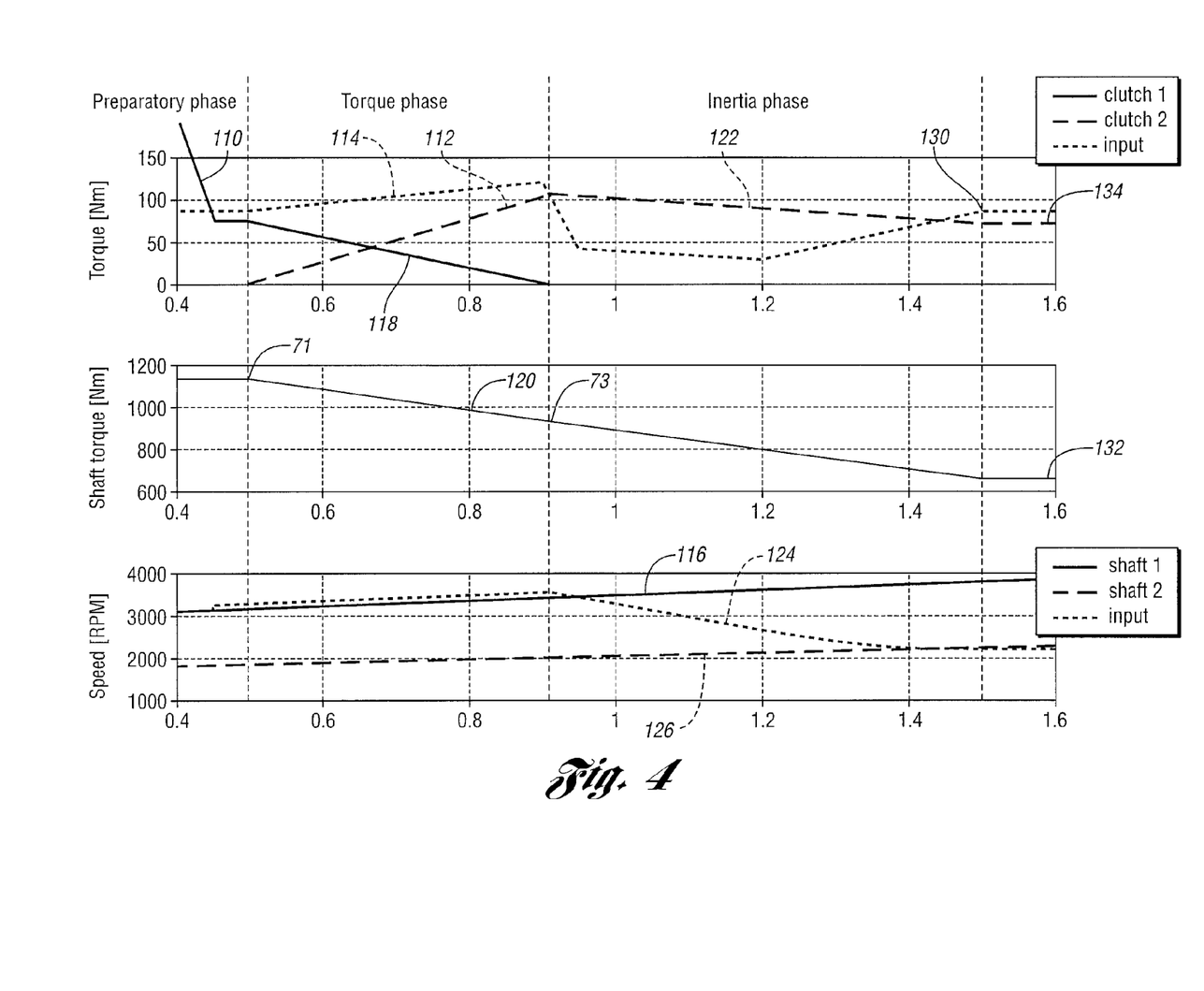
FIG. 4 is a time plot corresponding to FIG. 3 for the synchronous upshift control of the present invention wherein the torque hole is eliminated.

In contrast to the upshift characteristics shown in FIG. 3, FIG. 4 shows the upshift characteristics of an embodiment of the upshift control method of the invention. During the preparatory phase, the controller 83 reduces the torque capacity of the off-going clutch (discs 20) to prepare for its release, as shown at 110. The controller also adjusts the actuator piston for clutch 18 (the oncoming clutch) to prepare for its engagement.

During the torque phase, the controller 83 increases oncoming clutch torque capacity, as shown at 112, to prepare for its engagement. Input torque is increased, as shown at 114, while allowing clutch discs 20 to slip at a controlled level. Slipping the off-going clutch discs 20 causes input speed to be slightly greater, as shown at 124, than the shaft speed, shown at 116. This is true for a transmission having a slipping off-going clutch, but it is not true for a transmission with a locked off-going clutch.

When the off-going clutch 20 slips, its torque capacity or frictional torque is transmitted to shaft 22. Thus, the transmission controller can actively manage torque level that drives the gears coupled to the gearing connected to shaft 22 by adjusting the off-going clutch torque capacity 118. Similarly, when the oncoming clutch slips during the torque phase, its torque capacity, shown at 112, is transmitted to shaft 24, which drives the gearing (gearset #2) connected to shaft 24. Thus, when both the off-going clutch (OGC) and the oncoming clutch (OCC) slip during the torque phase, output shaft torque $\tau_{os}$ can be mathematically described as:

$$\tau_{os} = G_{on}\tau_{on} + G_{off}\tau_{off}, \quad \text{Eq. (1)}$$

where $\tau_{on}$ is OCC torque capacity, $\tau_{off}$ is OGC torque capacity, $G_{off}$ is gear ratio for low gear operation and $G_{on}$ is gear ratio for high gear operation. Equation (1) can be rearranged as:

$$\tau_{on} = \frac{\tau_{os} - G_{off}\tau_{off}}{G_{on}} \quad \text{Eq. (2)}$$

Rewriting $\tau_{os}$ as $\tau_{os,des}$, Eq. (2) can be expressed as:

$$\tau_{on} = \frac{\tau_{os,des} - G_{off}\tau_{off}}{G_{on}}, \quad \text{Eq. (3)}$$

where $\tau_{os,des}$ is a desired output shaft torque. The governing equation (3) of the present invention provides a systematic means to self-calibrate a level of OCC torque capacity $\tau_{on}$ for achieving a desired output torque profile $\tau_{os,des}$ while OGC slips during the torque phase. More specifically, torque profile $\tau_{os,des}$ can be specified to smoothly transition output shaft torque 120 before and after the torque phase, from point 71 to point 73 and after point 73, thereby eliminating or reducing the torque hole. OGC torque capacity $\tau_{off}$ can be estimated and actively adjusted based on OGC actuator position or clamping force. Thus, for a given $\tau_{off}$, Eq. (2) specifies a level of OCC torque capacity $\tau_{on}$ (112) required for achieving a desired output shaft torque 120.

During the torque phase, powertrain controller 75 and engine controller 77 control engine torque 114 or input shaft torque in order to maintain OGC slip at a desired level. This can be achieved, for example, by adjusting engine torque 114 using a closed-loop throttle control, valve timing control or fuel control or engine spark timing control based on OGC slip measurements independently from OCC and OGC torque control in a separate control loop or background loop, for the controller.

The transmission controller 83 (FIG. 1) could maintain enough OGC torque capacity during the torque phase without allowing OGC to slip. In this case, OGC still transmits a part of engine torque 114 to shaft #1 (22).

Output shaft torque is described as:

$$\tau_{os} = G_{off}\tau_{in} + (G_{on} - G_{off})\tau_{on}, \quad \text{Eq. (4)}$$

where input shaft torque $\tau_{in}$ can be equated to input torque $\tau_e$ (when the transmission has no torque converter). Replacing $\tau_{os}$ with a desired torque profile $\tau_{os,des}$, Eq. (4) can be rearranged as:

$$\tau_{on} = \frac{\tau_{os,des} - G_{off}\tau_e}{G_{on} - G_{off}} \text{ or } \tau_e = \frac{\tau_{os,des} - (G_{on} - G_{off})\tau_{on}}{G_{off}}. \quad \text{Eq. (5)}$$

Torque variables $\tau_{os}$ and $\tau_e$ can be represented as:

$$\tau_{os,des} = \tau_{os_0} - \Delta\tau_{os} \text{ and } \tau_e = \tau_{e_0} + \Delta\tau_e, \quad \text{Eq. (6)}$$

where $\tau_{os0}$ and $\tau_{e0}$ are the output shaft torque and engine torque at the beginning of the torque phase, respectively. $\Delta\tau_{os}$ and $\Delta\tau_e$ represent the change in output shaft torque and engine torque, respectively, at the elapsed time Δt after the torque phase begins. Substituting Eq. (6) into Eq. (5) yields:

$$\tau_{on} = \frac{\Delta\tau_{os,des} + G_{off}\Delta\tau_e}{G_{off} - G_{on}}. \qquad \text{Eq. (7)}$$

OCC torque $\tau_{on}$ can be written as:

$$\tau_{on} = \tau_{on_0} + \Delta\tau_{on}, \qquad \text{Eq. (8)}$$

where $\tau_{on_0}$ is the OCC torque capacity at the beginning of the torque phase and $\Delta\tau_{on}$ is the change in OCC torque at Δt. Substituting Eq. (8) into Eq. (7) results in:

$$\Delta\tau_{on} = \frac{\Delta\tau_{os,des} - G_{off}\Delta\tau_{off}}{G_{on}}, \qquad \text{Eq. (9)}$$

where $\Delta\tau_{off} = \tau_e - \Delta\tau_{on}$. (Note that Eq. (9) takes the same form as Eq. (3), which is the governing equation for slipping OGC.)

The governing equations (5), (7) and (9) provide a systematic means to self-calibrate a level of OCC torque capacity ($\tau_{on}$) for achieving a desired output torque profile ($\tau_{os,\ des}$) during torque phase when OGC remains locked. More specifically, a torque profile $\tau_{os,des}$ can be specified to smoothly transition the output shaft torque 120 from a time before the torque phase at 73 to a time after the torque phase, thereby eliminating or reducing a torque hole. For a given $\tau_{in}$ or $\tau_e$ at 114, Eq. (5) specifies a level of OCC torque capacity $\tau_{on}$ (112) required for achieving the target output torque profile $\tau_{os,des}$ (120).

Alternatively, for a given $\tau_{on}$ (112), may be used to systematically determine a target $\tau_e$ (114) or $\tau_{in}$ required for achieving desired output shaft torque $\tau_{os,des}$ (120). Once the target level is determined, $\tau_e$ or $\tau_{in}$ can be controlled through engine throttle control, spark timing control, intake and exhaust valve timing control, or through an auxiliary torque source such as an electric motor. (Note that engine torque control is coupled to OCC torque control in Eq. (5)).

The inertia phase begins at 73 in FIG. 4 when OGC is released. OGC transmits torque only at a non-significant level while OCC carries enough torque capacity, as shown at 122, to slow down input speed 124 so that it is closer to shaft #2 speed, as shown at 126. Under this condition, both Eq. (3) and Eq. (5) can be reduced to:

$$\tau_{on} = \frac{\tau_{os,des}}{G_{on}}. \qquad \text{Eq. (10)}$$

Thus, the output shaft torque $\tau_{os}$ (120) in the inertia phase is primarily affected by OCC torque capacity $\tau_{on}$ (122). According to the present invention, Equation (10) is used to provide a target OCC torque capacity $\tau_{on}$, during the inertia phase, that is required to achieve a seamless output shaft torque profile $\tau_{os,des}$ (120) from the torque phase to the inertia phase. $\tau_{on}$ is a feed-forward term. In addition, there is a feed back as well as an effect of a change in engine torque.

FIG. 4 shows reduced input torque during the inertia phase. This is typically due to engine spark timing control according to a common practice in a conventional shift control method, enabling OCC to engage within a target shift duration without requiring excessive torque capacity. The shift event is completed when OCC is securely engaged, thereby coupling input shaft 10 and shaft #2 (24). The engine torque reduction then is removed at 130 and the output shaft torque returns to a level 132, which corresponds to an engine torque level in the high gear configuration.

Figure 5:
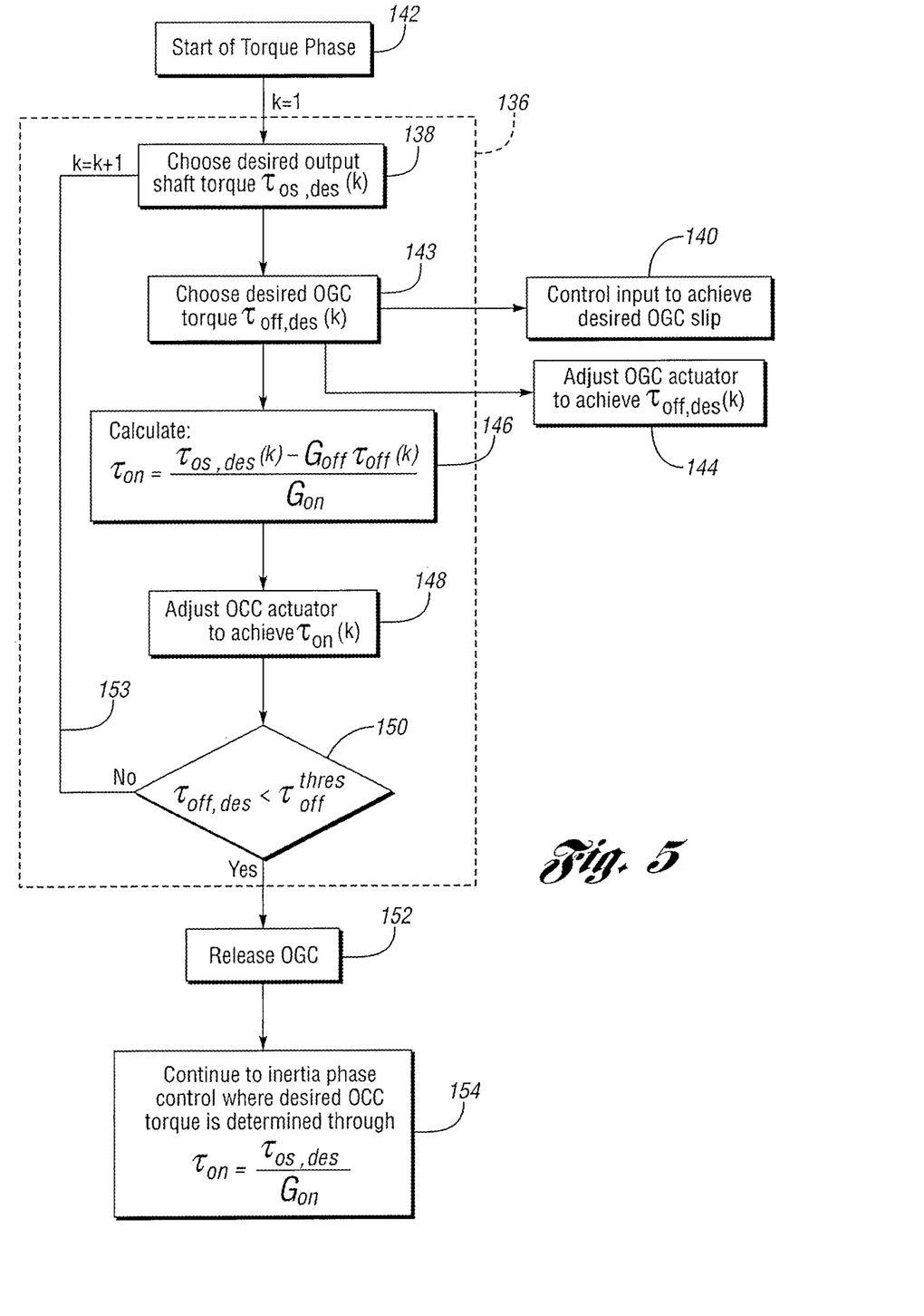
FIG. 5 is a flowchart showing the control strategy of the synchronous upshift control of the present invention when the off-going clutch is slipping.

FIG. 5 shows a control flow chart for the synchronous shift control of the present invention when the OGC is slipped during a torque phase. It describes a systematic approach to enable the shift control shown in FIG. 4. As previously stated, one of the advantages of this invention is the decoupling of OCC control, shown inside the dashed line 136, from engine control 140 and OGC control 144.

Engine torque can be actively and independently managed at 140 through a closed loop control to achieve a desired OGC slip speed. OGC torque capacity is adjusted through either closed loop control or open-loop control of its actuator position or actuator force. During a torque phase, a controller first chooses a desired level of output shaft torque (138). It also chooses desired OGC torque at 143. Then, the controller uses Equation (3) to self-calibrate the required level of OCC torque capacity at 146. It adjusts OCC actuator position at 148 or its torque capacity to realize the desired output shaft torque. The controller evaluates whether the end of the torque phase is reached at 150 based upon OGC torque capacity level. If it is not, it repeats the control loop at 153. It re-estimates the desired output shaft torque at 138 and chooses OGC torque capacity at 143 for the next controller time step k+1.

The end of the torque phase is reached when OGC torque becomes sufficiently small or less than a pre-specified threshold, $\tau_{thresoff}$, at 150. The controller then releases the OGC clutch 152 and moves to the inertia phase control at 154.

Equation (10) is used to determine a target OCC torque at 154 for a seamless output shaft torque transition from the torque phase to the inertia phase.

Figure 6:
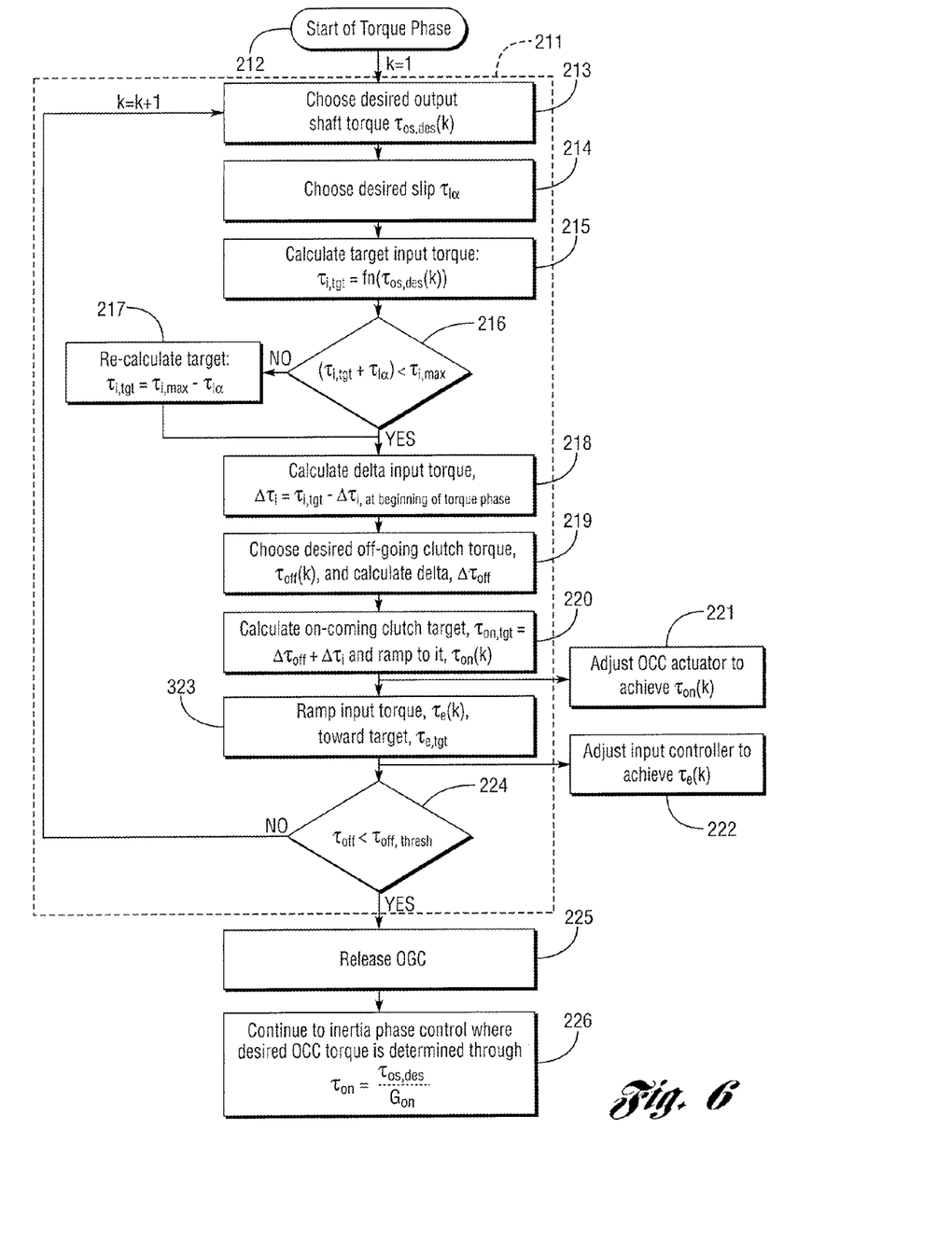
FIG. 6 is a flowchart showing an alternate control strategy for a non-synchronous upshift when the off-going clutch is slipping.

FIG. 6 illustrates an alternate control strategy that will achieve the oncoming clutch torque characteristics, the off-going clutch torque characteristics and the engine torque characteristics that will avoid output shaft torque disturbances previously described. As previously indicated, in the strategy of FIG. 5, the output shaft torque that is chosen is used to calculate an oncoming clutch torque as shown at block 146 in FIG. 5. Regardless of whether the strategy of FIG. 5 or the strategy of FIG. 6 is used, the objective is to ensure that the engine torque will be higher throughout the duration of the torque phase than the oncoming clutch torque. The engine speed will remain above the off-going clutch speed during the torque exchange that occurs during the torque phase as seen in FIG. 4. This prevents a torque reversal.

In FIG. 6, prior to the start of the torque phase at block 212, the off-going clutch torque will have decreased to a value that is slightly less than the input torque. This occurs during the preparatory stage as seen in FIG. 4. A desired output shaft torque then is chosen as shown at 213 rather than choosing a desired off-going clutch torque following the step at 213. As in the case of the FIG. 5 strategy routine, a desired slip is chosen at 214 as seen in FIG. 6. The value chosen is a value that will prevent torque source input speed flare during the torque phase. The slip torque depends upon the rate of change of engine speed (α) as well as engine inertia (I) if an engine is the torque source.

After the desired slip is determined at block 214, a target input torque is determined at block 215. This input torque ($\tau_{i,tgt}$) is a function of desired output shaft torque. The target input torque is that torque that exists for each control loop of a controller until the shift sequence reaches the end of the torque phase. If the sum of the target input torque and the desired slip torque is less than a precalibrated maximum value, as shown at block 216, the routine will continue to block 218 where a change in input torque ($\Delta_{\tau i}$) in any instant during the torque phase is equal to the target input torque ($\tau_{i,tgt}$) minus the change in input torque ($\Delta_{\tau i}$) at the beginning of the torque phase. If the sum of the target input torque and the slipping clutch torque at 216 is greater than $\tau_i$ maximum, the routine is recalculated at 217 until the inquiry at 216 is true.

The oncoming clutch target torque ($\tau_{on,tgt}$) is computed by determining the sum of the delta off-going clutch torque at 219 (change of torque) and the delta input torque calculated at 218 at the end of the torque phase. The input torque then is ramped upwardly to the target. This is the value for oncoming clutch torque at the end of the torque phase. The step of ramping the input torque is shown at 223 in FIG. 6. If the result of the ramping at 223 is an off-going clutch torque that is less than the off-going clutch threshold value, which is precalibrated, the off-going clutch will be released at shown at 225. As in the case of the routine of FIG. 5, the routine proceeds through the inertia phase where the desired oncoming clutch torque is determined by the equation shown at 226.

Figure 7:
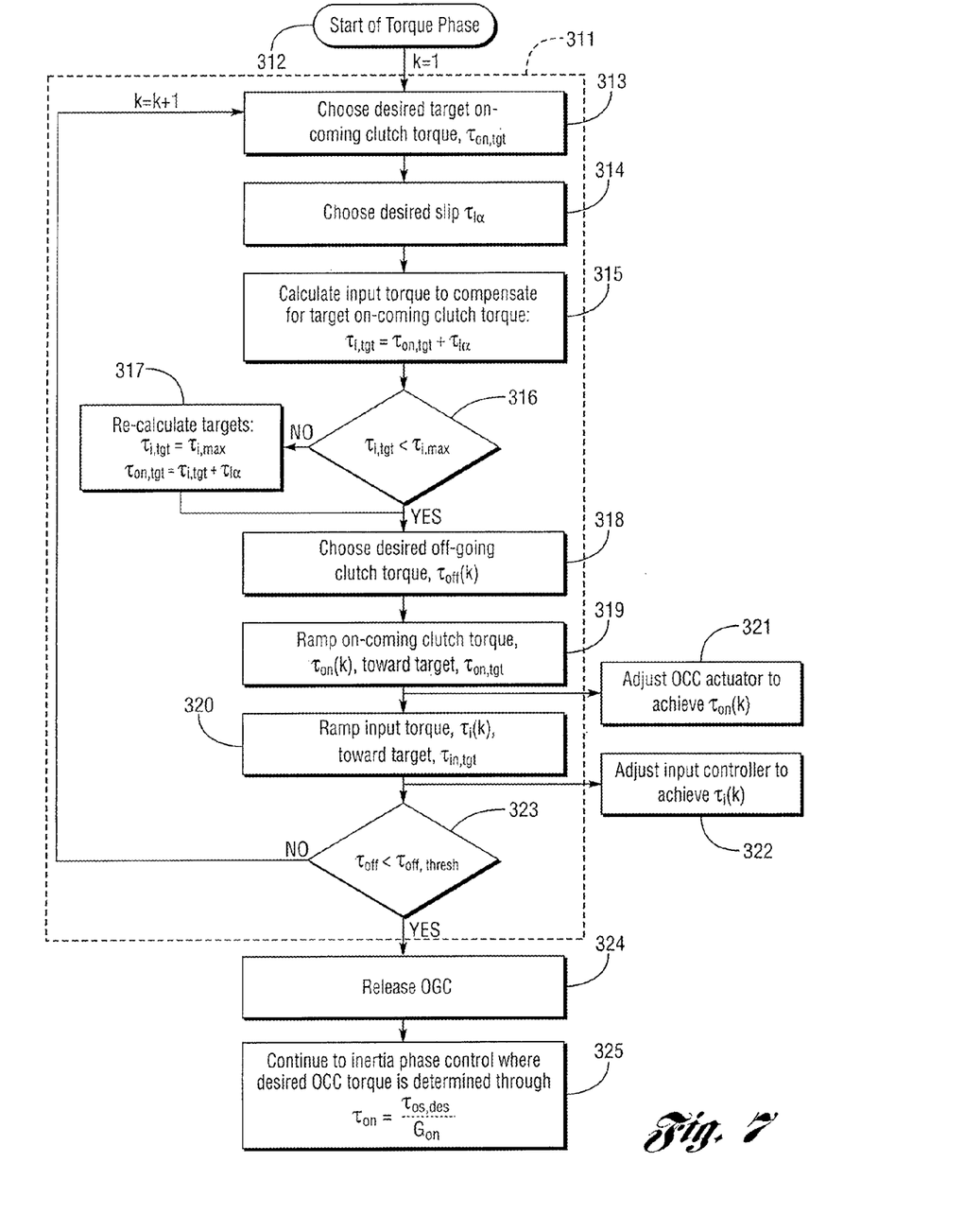
FIG. 7 is a flowchart showing another alternate control strategy for a non-synchronous upshift when the off-going clutch is slipping.

The routine 311 of FIG. 7 is somewhat similar to the routine 211 of FIG. 6 except, for example, that a desired target oncoming clutch torque is chosen following the start of the torque phase at 312. This is shown at block 313 in FIG. 7. In contrast, the desired output shaft torque is chosen in the case of FIG. 6 starting at the beginning of the torque phase. After choosing a desired slip at 314, the routine of FIG. 7 will calculate an input torque at 315 so that the input torque will be sufficiently increased to compensate for the target oncoming clutch torque. This is evident by the rising slope of the input torque plot of FIG. 4 during the torque phase.

If the target input torque is less than the maximum calibrated input torque, as shown at 316, the target input torque and the oncoming clutch torque target torque are recalibrated at 317 before the routine will continue.

If the inquiry at block 316 is true, the routine will advance to block 318 where a desired off-going clutch torque is chosen. This is the value at the end of the torque phase. Having established the desired off-going clutch torque, the oncoming clutch torque is ramped toward the target oncoming clutch torque at 319. The clutch actuator for the oncoming clutch torque is adjusted at 321 to achieve the target oncoming clutch torque. The routine then will continue to block 320 in FIG. 7 where the input torque is ramped toward the target torque at the end of the torque phase, followed by a controller adjustment at 322 to achieve the target.

A test then is made at 323, as in the case of the routine of FIG. 6, to determine whether the off-going clutch torque is less than a precalibrated off-going clutch torque threshold. The threshold torque is determined so that a residual torque will be maintained in the clutch actuator rather than having the off-going clutch torque fall to zero. The off-going clutch torque then is released and the routine continues to the inertia phase as shown at 324 and 325.

It is to be understood that this invention is not limited to the exact shift control steps illustrated and described. Various modifications and equivalents thereof, including revisions to the governing equations (3), (5), (7) and (9), may be made by persons skilled in the art without departing from the spirit and the scope of the invention to make this invention applicable to all types of automatic transmissions, including both a layshaft type and a planetary type.

What is claimed:

1. A control system for an automotive powertrain having a torque source and a multiple ratio transmission with pressure actuated oncoming friction elements and off-going friction elements for effecting ratio upshifts and a shift controller configured to:
    (i) control activating pressure of the friction elements during a torque phase of a transmission upshift to effect controlled release and engagement of the friction elements;
    (ii) increase torque of the torque source at a controlled rate during the torque phase as the off-going friction elements slip during the torque phase; and
    (iii) decrease torque of the oncoming friction elements during an inertia phase of the transmission upshift to effect a controlled decrease in torque of a transmission output shaft;
    whereby a smooth transition is made from the torque phase to the inertia phase.

2. The control system set forth in claim 1 wherein the control system is configured to modulate torque of the torque source following the torque phase.

3. A control system for a powertrain with a multiple ratio power transmission for an automotive vehicle comprising:
    a torque source;
    oncoming and off-going pressure actuated friction elements for establishing, respectively, a driving connection between the torque source and first and second torque delivery gear elements of the transmission;
    powertrain controllers configured to establish a ratio upshift event with a preparatory phase, a torque phase and an inertia phase;
    the controllers being configured further:
        (i) to control activating pressure of the friction elements during the torque phase to effect controlled release and engagement of the friction elements;
        (ii) to increase torque level of the torque source at a controlled rate during the torque phase as the off-going friction elements slip during the torque phase;
        (iii) to reduce the torque level of the torque source during a transition from the torque phase to the inertia phase; and
        (iv) to increase torque of the torque source at the end of the inertia phase.

4. A control system for a multiple ratio powertrain with an automatic transmission in an automotive vehicle having a source of driving torque, first and second torque input gear elements of the transmission, oncoming and off-going pressure actuated friction elements for establishing, respectively, a driving connection between the torque source and the first and second torque input gear elements of the transmission, the control system including:
    a powertrain controller configured to establish an upshift with a preparatory phase, a torque phase and an inertia phase during an upshift event;
    a transmission controller in electrical communication with the powertrain controller for activating pressure actuators for the oncoming and off-going friction elements;
    the powertrain and transmission controllers being configured to control oncoming friction element torque capacity during the torque phase in coordination with torque control of the torque source wherein torque control of the torque source and the off-going friction element are decoupled from control of the oncoming friction elements, the torque control of the torque source being independently managed to obtain a controlled increase in torque of the torque source prior to the inertia phase.

5. The control system set forth in claim 4, wherein the off-going friction element torque capacity is controlled using closed loop control with off-going friction element pressure as a feedback variable.

6. The control system set forth in claim 5 wherein the control system includes a clutch actuator wherein the off-going friction element feedback variable is determined by the position of an actuator for the off-going friction element.

7. The control system set forth in claim 1, wherein the off-going friction element torque capacity is open loop controlled.

8. The control system set forth in claim 7, wherein the torque control of the torque source is a closed loop control.

9. The control system set forth in claim 4, wherein the controllers are configured to control the torque source and activating pressure of the off-going friction element to achieve a desired slip of the off-going friction element during the torque phase.

10. The control system set forth in claim 4, wherein the powertrain controller is adapted to determine a desired level of driving torque and torque of the torque source and to self-calibrate a required level of oncoming friction element torque capacity.

11. The control system set forth in claim 10, wherein the powertrain controller is adapted to calculate torque transmitted through the off-going friction element to determine an end of the torque phase.

12. The control system set forth in claim 10, wherein the powertrain controller is adapted to determine an end of the torque phase at an elapsed time from the beginning of the torque phase, a corresponding change in torque of the torque source and a corresponding change in driving torque.

13. The control system set forth in claim 4, wherein the powertrain controller is configured to reduce torque of the torque source during the inertia phase and increase it when the inertia phase ends whereby driving torque change during the inertia phase is reduced.

14. A control system as set forth in claim 4 wherein the powertrain controller is configured to raise torque capacity of the oncoming friction element during the torque phase to effect its engagement during the torque phase;
the controller being configured still further to increase torque of the torque source during the torque phase as torque capacity of the off-going friction element is reduced during the torque phase to allow a small slip whereby the powertrain controller manages torque distributed from the torque source.

15. The control system set forth in claim 14 wherein the controller is configured to self-calibrate clutch capacity of the oncoming friction element during the torque phase to achieve a desired driving torque output profile with respect to time before shift completion as the off-going friction element slips during the torque phase.

16. The control system set forth in claim 15 wherein the powertrain controller adjusts torque of the torque source to maintain slip of the off-going friction element during the torque phase at a desired level.

17. The control system set forth in claim 16 wherein torque of the torque source is adjusted during the torque phase with closed loop control using a measured slip of the off-going friction element as a feedback variable.

18. The control system set forth in claim 17 wherein torque of the torque source during the torque phase is independent of control of the off-going and oncoming friction elements.

19. The control system set forth in claim 14 wherein the powertrain controller and the transmission controller are configured to reduce torque of the torque source during the inertia phase.

20. The control system set forth in claim 15 wherein the powertrain controller and the transmission controller are configured to reduce torque of the torque source during the inertia phase.

21. The control system set forth in claim 16 wherein the powertrain controller and the transmission controller are configured to reduce torque of the torque source during the inertia phase.

22. The control system set forth in claim 17 wherein the powertrain controller and the transmission controller are configured to reduce torque of the torque source during the inertia phase.

23. The control system set forth in claim 18 wherein the powertrain controller and the transmission controller are configured to reduce torque of the torque source during the inertia phase.

24. The control system set forth in claim 5 wherein the off-going friction element torque capacity is open loop controlled.

25. The control system set forth in claim 7 wherein the torque control of the torque source is a closed loop control.

26. A method for controlling an upshift of a multiple ratio automatic transmission in an automotive vehicle powertrain with a source of driving torque, the transmission having an oncoming friction element in a torque flow path to a transmission gearing element and an off-going friction element in a torque flow path to another gearing element, the torque flow paths extending to a driven shaft, the upshift being characterized by a torque phase and an inertia phase, the method comprising:
increasing driving torque at a controlled rate during the torque phase and decreasing driving torque during a transition from the torque phase to the inertia phase until the upshift is substantially ended;
decreasing off-going friction element capacity during the torque phase while allowing controlled slip; and
increasing torque capacity of the oncoming friction element during the torque phase whereby torque disturbances in the driven shaft are moderated.

27. A method for controlling an upshift of an automatic transmission in an automotive vehicle powertrain with a source of driving torque, the transmission having separate friction elements that are engaged and released in synchronism to establish a gear ratio upshift as torque is delivered to a torque output shaft from the torque source to separate gearing elements of the transmission, the upshift being characterized by a torque phase and an inertia phase, the method comprising:
choosing a desired output shaft torque during the torque phase;
choosing a desired off-going friction element torque;
calculating oncoming friction element torque as a function of desired off going friction element torque and desired output shaft torque;
controlling an oncoming friction element to achieve the calculated oncoming friction element torque;
controlling the torque source to achieve a desired off-going friction element slip and adjusting off-going friction element pressure to achieve the desired off-going friction element torque; and
releasing the off-going friction element at the end of the torque phase.

28. The method set forth in claim 27 wherein the step of controlling the torque source is followed by a determination of whether the desired off-going friction element torque is less than a predetermined threshold value before allowing the off-going friction element to be released when the torque phase ends.

29. The method set forth in claim 28 wherein oncoming friction element torque during the inertia phase is determined as a function of desired output shaft torque and gear ratio for the oncoming friction element and for the off-going friction element.

30. The control system set forth in claim 14 wherein control of the oncoming friction element during the torque phase is expressed as:

$$\tau_{on} = \frac{\tau_{os,des} - G_{off}\tau_{off}}{G_{on}},$$

where
$\tau_{on}$=the oncoming friction element torque,
$\tau_{os,des}$=desired output shaft torque,
$\tau_{off}$=the off-going friction element torque,
$G_{off}$=gear ratio for the off-going friction element, and
$G_{on}$=gear ratio for the oncoming friction element.

31. The control system set forth in claim 14 wherein the powertrain controller is further configured to establish a preparatory phase prior to the torque phase and to reduce torque capacity of the off-going friction element during the preparatory phase to prepare for its release.

32. A control system for an automotive powertrain having a torque source and a multiple ratio transmission with pressure actuated oncoming friction elements and off-going friction elements for effecting ratio upshifts and a shift controller configured to:
  (i) choose a desired transmission output torque and a desired off-going friction element slip torque during a torque phase of an upshift;
  (ii) calculate a target input torque as a function of desired transmission output torque and a delta input torque based on the target input torque;
  (iii) choose a desired off-going friction element torque and calculating a delta off-going friction element torque;
  (iv) calculate oncoming friction element target torque based on delta off-going friction element torque and ramping oncoming friction element torque to the oncoming friction element target torque; and
  (v) ramp input torque toward the target input torque, whereby a smooth transition is made to an inertia phase during which torque of the torque source is decreased during the inertia phase.

33. A control system for an automotive powertrain having a torque source and a multiple ratio transmission with pressure actuated oncoming friction elements and off-going friction elements for effecting ratio upshifts, and a shift controller configured to:
  (i) choose a desired target oncoming friction element torque during a torque phase of an upshift and choose a desired input torque slip;
  (ii) calculate an input torque of the torque source to compensate for the desired target oncoming friction element torque;
  (iii) choose a desired off-going friction element torque;
  (iv) ramp oncoming friction element toque toward the target oncoming friction element torque; and
  (v) ramp the input torque toward the target torque prior to release of the off-going friction element as a transition is made to an inertia phase whereby torque disturbances in torque delivery through the transmission are reduced during an upshift.

34. A method for controlling an upshift of a multiple ratio transmission in an automotive vehicle powertrain having a torque source and a torque output shaft connected drivably to vehicle traction wheels, the transmission including an off-going friction element and an oncoming friction element that are released and applied, respectively, during a torque phase of a transmission ratio upshift, the method comprising the steps of:
  choosing a desired output shaft torque and a desired slip of the off-going friction element;
  calculating a target input torque from the torque source as a function of desired output shaft torque;
  calculating an oncoming friction element torque target, based on a desired off-going friction element torque; and
  increasing torque of the torque source toward the target input torque followed by release of the off-going friction element as a transition is made from the torque phase to an inertia phase in the upshift.

35. A method for controlling an upshift of a multiple ratio transmission in an automotive vehicle powertrain having a torque source and a torque output shaft, the transmission including an off-going friction element and an oncoming friction element that are released and applied, respectively, during a torque phase of a transmission ratio upshift, the method comprising the steps of:
  choosing a desired oncoming friction element torque target;
  choosing a desired input slip torque;
  calculating an input torque target for the torque source using the oncoming friction element torque target and the desired input slip torque;
  choosing a desired off-going friction element torque;
  ramping oncoming friction element torque toward the oncoming friction element target; and
  ramping input torque from the torque source toward the target input torque and releasing the off-going friction element as the torque of the torque source is decreased at the start of an inertia phase of the upshift.

* * * * *